United States Patent [19]
Glaze

[11] 3,923,240
[45] Dec. 2, 1975

[54] LAND VEHICLE WHEEL SUSPENSION ARRANGEMENT

[75] Inventor: Stanley George Glaze, Brierley Hill, England

[73] Assignee: Lucas Aerospace Limited, Birmingham, England

[22] Filed: Aug. 26, 1974

[21] Appl. No.: 500,578

[52] U.S. Cl.......... 280/124 F; 267/65 D; 74/625.69
[51] Int. Cl.²......................................... B60G 11/64
[58] Field of Search..... 280/124 F; 267/65 R, 65 D; 74/625.69

[56] References Cited
UNITED STATES PATENTS

| | | | |
|---|---|---|---|
| 2,496,040 | 1/1950 | Criley | 137/625.69 |
| 2,679,829 | 6/1954 | Gorrie | 137/625.69 |
| 3,054,424 | 9/1962 | Alfieri | 280/124 F |
| 3,523,672 | 8/1970 | Barsby | 137/625.69 |
| 3,589,933 | 6/1971 | Pitcher | 280/124 F |
| 3,598,423 | 8/1971 | Clarenbach | 280/124 F |
| 3,742,980 | 7/1973 | Byers | 137/625.69 |
| 3,778,081 | 12/1973 | Takahashi | 280/124 F |

*Primary Examiner*—Philip Goodman
*Assistant Examiner*—John A. Carroll
*Attorney, Agent, or Firm*—Harness, Dickey & Pierce

[57] ABSTRACT

A land vehicle wheel suspension arrangement includes a device sensitive to the direction of displacement of a wheel carrier relative to the vehicle body, a device sensitive to the direction of movement of the wheel carrier, and means actuable by these two devices to operate a clutch to stiffen the suspension (either by changing a spring characteristic or by varying a damping characteristic) when the directions are the same and to operate the clutch to soften the suspension when the directions are opposite.

5 Claims, 1 Drawing Figure

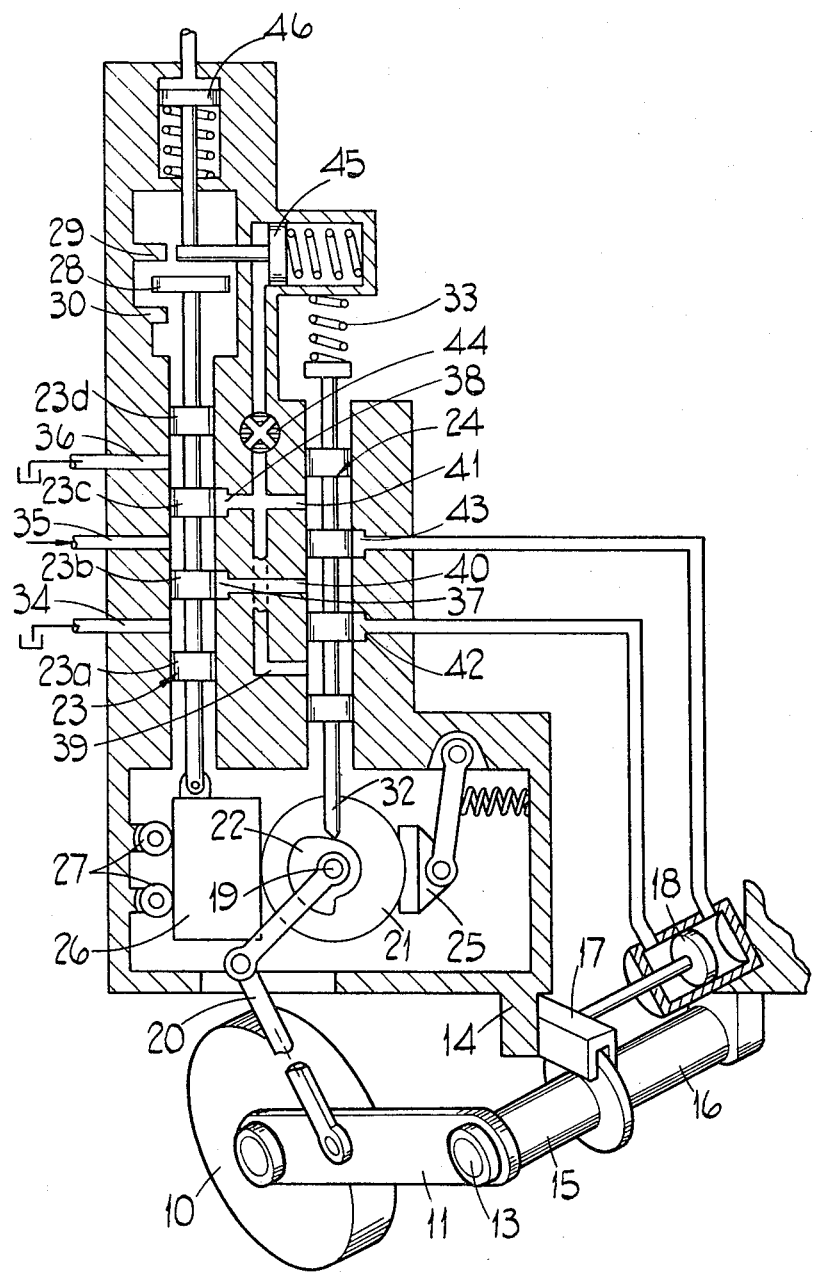

LAND VEHICLE WHEEL SUSPENSION ARRANGEMENT

This invention relates to a land vehicle wheel suspension arrangement of the kind in which each wheel carrier is mounted for movement relative to the vehicle body and is resiliently biased by spring means arranged between the wheel carrier and the body, clutch means being provided selectively connecting part of the spring means or damping means associated therewith directly to the body or to the carrier, so as to vary the stiffness of the suspension.

It is to be understood that the spring means may be either mechanical springs such as torsion bars and pneumatic springs or hydro-pneumatic springs. In the former case the clutch device is a simple mechanical clutch whereas in the latter case it may be in the form of a valve controlling fluid communication between the spring devices.

In an arrangement where the spring means consisted of two spring devices in series it has previously been proposed to use a clutch control arrangement which comprises a device sensitive to the oscillation velocity of the body of the vehicle and arranged to disengage the clutch whenever the body oscillation velocity is zero. The device was arranged to re-engage the clutch after a time delay equal to half the natural period of oscillation of the point of interconnection of the springs.

Such an arrangement is not thought to give an optimum suspension characteristic and it is an object of the invention to provide a suspension arrangement of the kind specified with a new or improved control arrangement.

In accordance with the invention there is provided a suspension system of the kind specified which includes a control device comprising means sensitive to the direction in which the wheel carrier is displaced from a datum position relative to the body, means sensitive to the direction in which the wheel carrier is moving relative to the body and means actuable by said direction sensitive means for operating the clutch means to stiffen the suspension when said directions are the same and operating the clutch to soften the suspension when said directions are opposite.

An example of the invention is shown diagrammatically in the accompanying drawing.

In the arrangement shown a rear wheel 10 of a vehicle is rotatably mounted on a carrier 11 which is in the form of an arm pivotable about an axis 13 on the body 14 of the vehicle. The arm 11 is resiliently biased by a pair of torsion bar spring devices 15, 16 in series. The bar 15 is connected at one end to the arm 11 and at the other end to one end of the bar 16. The other end of the bar 16 is secured to the body 14.

At the interconnection of the two bars 15, 16 there is a clutch device 17 for connecting said other end of the bar 15 directly to the vehicle body 14. This clutch device is operated by an hydraulic piston and cylinder unit 18 mounted on the body 14 and arranged to engage the clutch on movement of the piston thereof to the right as viewed in the drawing.

To obtain the desired suspension characteristics it is required to engage the clutch 17 whenever the arm 11 is in a position displaced in either direction from a datum position and moving away from that datum position. The arrangement shown achieves this result with an arrangement of valves but it will be appreciated that electromechanical means could equally be employed to obtain the result.

The arrangement shown comprises a shaft 19 spaced from and parallel to the pivot axis 13 of the arm 11. On this shaft which is coupled to the arm 11 by a linkage 20 are a roller 21 and a cam 22. The purpose of the roller 21 is to displace a first valve spool 23 upwardly or downwardly according to whether the arm 11 is turning in clockwise or anti-clockwise direction at any given instant. The purpose of the cam 22 is to displace a second valve spool 24 upwardly or downwardly according to whether the arm 11 is above or below its datum position.

The roller 21 is urged by a spring loaded pusher 25 against a slider 26 which is coupled to the valve spool 23. This slider 26 is urged by the roller 21 against a pair of guide rolls 27 on low friction bearings so that turning of the roller 21 in a clockwise direction will cause an upward frictional force to be applied to the slider 26 whereas turning it in an anti-clockwise direction causes a downward frictional force to be applied thereto. The valve spool 23 has an abutment 28 thereon which co-acts with two stops 29, 30 to limit the travel of the spool 23. When the roller 21 is turned to urge the slider 26 in a direction such that the abutment 28 is engaged with one of these stops the roller 21 merely slips on the slider 26. Thus it will be seen that when the roller 21 is oscillated the spool 23 will move between its limiting positions each time the direction of movement of the roller 21 changes.

The cam 22 is engaged by a follower 32 on the spool 24 and there is a spring 33 acting on the spool 24 to keep the follower 32 in engagement with the cam 22.

The valve spools 23, 24 are arranged in series to control the connection of the unit 18 to a high pressure supply and to drain. To this end the spool 23 has four lands 23a, 23b, 23c and 23d and slides in a bore into which ports 34, 35, and 36 open between the adjacent lands respectively. The port 35 is connected to the supply and the ports 34, 36 to drain. The lands 23b, 23c two further ports 37 and 38 so that when the spool 23 moves upwardly from its mid-position port 37 is connected to drain and port 38 to the supply and when the spool 23 moves downwardly these connections are reversed.

The spool 24 is of similar construction and has three input ports 39, 40, 41, the port 40 being connected to port 37 and the ports 39, 41 being connected to the port 38 and two output ports 42, 43 controlled by the lands of spool 24 so as to connect port 42 to port 38 and port 43 to port 37 when spool 24 is above of its datum position and reverse these connections when spool 24 is below its datum position. The ports 42, 43 are connected to the ends of the unit 18.

Thus, when spools 23 and 24 are both raised or both lowered the clutch 17 is engaged to make the suspension stiffer than when the clutch 17 is disengaged, which occurs when one spool is raised and the other lowered.

To allow for problems which may occur in a system as described during braking a brake interlock arrangement is included. This arrangement uses a valve 44 which is opened whenever the brakes are applied and which serves to connect port 38 to a single acting spring-loaded plunger unit 45. The brake supply pressure is also supplied to another spring-loaded single acting plunger unit 46 which can co-act with the abutment to move it away from the stop 29. The plunger 45, is, however, normally in the path of the plunger 46.

On application of the brakes, the first effect will be the effective transfer of weight to the front wheels of the vehicle. In the case of the rear wheels the plunger 45 initially prevents plunger 46 from coming into operation, so that pitching of the vehicle body is limited by the stiff suspension configuration which occurs with the clutch 17 engaged. When the body has pitched fully forward and attempts to commence a reverse pitch valve 23 changes position and high pressure oil passes to plunger 45 allowing plunger 41 to descend to override the action of roller 21 on the slider 26 and maintain the clutch 17 engaged. The clutch then remains in this condition until the brakes are released.

The front wheel arrangement is similar to that described above but the arrangement of the brake interlock arrangement is modified to operate in a slightly different manner. In this case it is required to allow the front of the vehicle to dip and then maintain the front suspension stiff when the front begins to rise. The equivalent of the unit 46 is arranged to be urged upwardly by the brake fluid pressure and has a head on its end to pull up the spool 23. The unit 45 cuts initially to prevent the piston of unit 46 from rising.

The springs of the suspension may be arranged in parallel rather than in series and in this case the clutch controls the connection of one spring to the body, the suspension being stiffened when the clutch is engaged as before.

The invention may also be applied to suspensions involving various arrangements of springs and dampers, e.g. a single spring between the body and the carrier with a pair of dampers in series between the body and the carrier with the interconnection of the dampers clutchable to the body or to the carrier.

I claim:

1. A land vehicle wheel suspension arrangement for a wheel carrier displaceable in opposite directions from a datum position relative to a vehicle body, including a control device comprising first means sensitive to the direction in which the wheel carrier is displaced from said datum position relative to the body, second means sensitive to the direction in which the wheel carrier is moving relative to the body, a wheel carrier suspension, clutch means movable between a position stiffening said suspension and a position softening said suspension, and means actuable by said first and second direction sensitive means for operating the clutch means to stiffen the suspension when the directions sensed by both direction sensitive means are the same and operating the clutch to soften the suspension when said directions are opposite.

2. A suspension arrangement as claimed in claim 1 in which said first means sensitive to the direction in which the wheel carrier is displaced from said datum position includes a cam member coupled to the wheel carrier for rotation thereby, fluid pressure connections to said clutch, a spring-loaded "position" valve spool, and means responsive to movement of said cam member for moving said spool against said spring loading to control said fluid pressure connections to the clutch.

3. A suspension arrangement as claimed in claim 1 in which the second means sensitive to the direction of movement of the wheel carrier comprises a roller rotatable by the carrier, a slider, means urging said roller against said slider so that the slider is displaceable in opposite directions by frictional engagement with the roller, fluid pressure connections to said clutch, and a "direction" valve spool coupled to the slider and permitted limited sliding axial movement to control said fluid pressure connections to the clutch.

4. A suspension arrangement as claimed in claim 1, said vehicle having a braking system, and brake pressure sensitive means connected in said braking system of the vehicle and to said suspension arrangement and including means responsive to operation of said braking system for locking said "direction" valve spool at one end of its axial movement.

5. A suspension arrangement as claimed in claim 1, said suspension comprising a torsion bar spring acting on said carrier, said clutch being operative to shorten the effective length of said torsion bar spring.

* * * * *